United States Patent
Teo et al.

(10) Patent No.: US 10,961,340 B2
(45) Date of Patent: Mar. 30, 2021

(54) METHOD FOR PROVIDING SURFACE MODIFYING COMPOSITION WITH IMPROVED BYPRODUCT REMOVAL

(71) Applicant: Fresenius Medical Care Holdings, Inc., Waltham, MA (US)

(72) Inventors: Jiunn Teo, Pleasant View, UT (US);
Craig Kamerath, Ogden, UT (US);
Praveen Kosaraju, Farmington, UT (US); Monica P. Hall, Ogden, UT (US)

(73) Assignee: FRESENIUS MEDICAL CARE HOLDINGS, INC., Waltham, MA (US)

( * ) Notice: Subject to any disclaimer, the term of this patent is extended or adjusted under 35 U.S.C. 154(b) by 215 days.

(21) Appl. No.: 16/033,237

(22) Filed: Jul. 12, 2018

(65) Prior Publication Data
US 2019/0016845 A1    Jan. 17, 2019

Related U.S. Application Data

(60) Provisional application No. 62/532,397, filed on Jul. 14, 2017.

(51) Int. Cl.
*C08G 18/38*    (2006.01)
*C08G 18/71*    (2006.01)
(Continued)

(52) U.S. Cl.
CPC ..... *C08G 18/3812* (2013.01); *C08G 18/0852* (2013.01); *C08G 18/10* (2013.01);
(Continued)

(58) Field of Classification Search
None
See application file for complete search history.

(56) References Cited

U.S. PATENT DOCUMENTS

| 3,392,183 A | 7/1968 | Windemuth et al. |
| 3,427,366 A | 2/1969 | Verdol et al. |

(Continued)

FOREIGN PATENT DOCUMENTS

| CN | 1711127 A | 12/2005 |
| CN | 1894302 A | 1/2007 |

(Continued)

OTHER PUBLICATIONS

BioInterface 2011 Conference Agenda (available at sib.affiniscape.com/cde.cfm?event=331217&addEventId=331217), with text of abstracts from presentations by Cai, "Carboxyl-Ebselen-Based Layer-by-Layer Film: A Potential Antithrombotic and Antimicrobial Coating" (Oct. 25, 2011); Cook, "Surface Modifications with Improved Long-Term Hemocompatability" (Oct. 25, 2011); Dirks, "Non-Adhesive and Antimicrobial Coatings for Medical Implants" (Oct. 26, 2011); and Strokowski, "Adsorption and Hemocompatibility Properties of Elastin-like Polypeptide Surfaces" (Oct. 25, 2011).

(Continued)

*Primary Examiner* — Tae H Yoon
(74) *Attorney, Agent, or Firm* — Kilyk & Bowersox, P.L.L.C.

(57) ABSTRACT

A method forming a surface modifying composition with reduced need for organic solvent and evaporation thereof for removal of insoluble reaction byproducts from the composition. The purified composition can be used in the formation of articles having improved biocompatibility, such as medical articles (e.g., spun hollow fiber).

21 Claims, 4 Drawing Sheets

(51) Int. Cl.

| | | |
|---|---|---|
| C08G 18/77 | (2006.01) | |
| C08G 18/10 | (2006.01) | |
| C08L 39/06 | (2006.01) | |
| C08L 27/16 | (2006.01) | |
| C08L 33/20 | (2006.01) | |
| C08L 81/06 | (2006.01) | |
| D01D 1/02 | (2006.01) | |
| D01D 1/10 | (2006.01) | |
| D01D 5/24 | (2006.01) | |
| C08G 18/79 | (2006.01) | |
| C08G 18/75 | (2006.01) | |
| C08G 18/08 | (2006.01) | |
| C08G 18/73 | (2006.01) | |
| C08G 18/42 | (2006.01) | |

(52) U.S. Cl.
CPC ......... *C08G 18/425* (2013.01); *C08G 18/712* (2013.01); *C08G 18/73* (2013.01); *C08G 18/758* (2013.01); *C08G 18/773* (2013.01); *C08G 18/792* (2013.01); *C08L 27/16* (2013.01); *C08L 33/20* (2013.01); *C08L 39/06* (2013.01); *C08L 81/06* (2013.01); *D01D 1/02* (2013.01); *D01D 1/106* (2013.01); *D01D 5/24* (2013.01)

(56) References Cited

U.S. PATENT DOCUMENTS

| | | |
|---|---|---|
| 3,759,788 A | 9/1973 | Gajewski et al. |
| 3,872,058 A | 3/1975 | Gresham |
| 4,312,907 A | 1/1982 | Hiraoka et al. |
| 4,424,311 A | 1/1984 | Nagaoka et al. |
| 4,465,480 A | 8/1984 | Tanaka et al. |
| 4,584,362 A | 4/1986 | Leckart et al. |
| 4,661,530 A | 4/1987 | Gogolewski et al. |
| 4,742,090 A | 5/1988 | Hunter et al. |
| 4,743,629 A | 5/1988 | Karakelle et al. |
| 4,788,083 A | 11/1988 | Dammann et al. |
| 4,792,354 A | 12/1988 | Matsuo et al. |
| 4,861,830 A | 8/1989 | Ward, Jr. |
| 4,879,032 A | 11/1989 | Zemlin |
| 4,966,699 A | 10/1990 | Sasaki et al. |
| 4,994,503 A | 2/1991 | Harris et al. |
| 4,996,054 A | 2/1991 | Pietsch et al. |
| 5,064,871 A | 11/1991 | Sciangola |
| 5,100,992 A | 3/1992 | Cohn et al. |
| 5,145,727 A | 9/1992 | Potts et al. |
| 5,149,576 A | 9/1992 | Potts et al. |
| 5,242,995 A | 9/1993 | Kim et al. |
| 5,264,572 A | 11/1993 | Endo et al. |
| 5,298,431 A | 3/1994 | Goldstein et al. |
| 5,322,659 A | 6/1994 | Walder et al. |
| 5,395,525 A | 3/1995 | Takano et al. |
| 5,428,123 A | 6/1995 | Ward et al. |
| 5,486,570 A | 1/1996 | St. Clair |
| 5,542,200 A | 8/1996 | Matsuoka |
| 5,543,200 A | 8/1996 | Hargis et al. |
| 5,589,563 A | 12/1996 | Ward et al. |
| 5,779,897 A | 7/1998 | Kalthod et al. |
| 5,908,701 A | 6/1999 | Jennings et al. |
| 5,929,201 A | 7/1999 | Gibbons et al. |
| 5,954,966 A | 9/1999 | Matsuura et al. |
| 5,969,082 A | 10/1999 | Kuwahara et al. |
| 6,111,049 A | 8/2000 | Sendjarevic et al. |
| 6,113,785 A | 9/2000 | Miura et al. |
| 6,127,485 A | 10/2000 | Klun et al. |
| 6,127,507 A | 10/2000 | Santerre |
| 6,254,645 B1 | 7/2001 | Kellis, Jr. et al. |
| 6,348,152 B1 | 2/2002 | Kawahara et al. |
| 6,353,057 B1 | 3/2002 | He et al. |
| 6,448,364 B1 | 9/2002 | Clatty et al. |
| 6,551,267 B1 | 4/2003 | Cohen et al. |
| 8,071,683 B2 | 12/2011 | Mullick et al. |
| 8,178,620 B2 | 5/2012 | Mullick et al. |
| 8,318,867 B2 | 11/2012 | Mullick et al. |
| 8,338,537 B2 | 12/2012 | Mullick et al. |
| 8,784,664 B2 | 7/2014 | Fislage et al. |
| 8,877,062 B2 | 11/2014 | Mullick et al. |
| 9,346,021 B2 | 5/2016 | Qtaishat et al. |
| 9,353,220 B2 | 5/2016 | Savariar et al. |
| 9,687,597 B2 | 6/2017 | Mullick et al. |
| 9,884,146 B2 | 2/2018 | Mullick et al. |
| 2003/0021826 A1 | 1/2003 | Crost et al. |
| 2004/0063200 A1 | 4/2004 | Chaikof et al. |
| 2004/0121175 A1 | 6/2004 | Flexman et al. |
| 2004/0234575 A1 | 11/2004 | Horres et al. |
| 2005/0176893 A1 | 8/2005 | Rana et al. |
| 2006/0155095 A1 | 7/2006 | Daussin et al. |
| 2006/0205309 A1 | 9/2006 | Mabuchi et al. |
| 2007/0014927 A1 | 1/2007 | Buckanin et al. |
| 2007/0032624 A1 | 2/2007 | Roesler et al. |
| 2007/0037891 A1 | 2/2007 | Esfand et al. |
| 2008/0113199 A1 | 5/2008 | Peng et al. |
| 2008/0203012 A1 | 8/2008 | Yeager et al. |
| 2008/0228253 A1 | 9/2008 | Mullick et al. |
| 2008/0237127 A1 | 10/2008 | Okafuji et al. |
| 2009/0211968 A1 | 8/2009 | Ho et al. |
| 2010/0063585 A1 | 3/2010 | Hoffmann et al. |
| 2011/0009799 A1 | 1/2011 | Mullick et al. |
| 2011/0207893 A1 | 8/2011 | Mullick et al. |
| 2011/0271961 A1 | 11/2011 | Mullick et al. |
| 2012/0148774 A1 | 6/2012 | Mullick et al. |
| 2012/0220724 A1 | 8/2012 | Mullick et al. |
| 2014/0158610 A1 | 6/2014 | Qtaishat et al. |
| 2014/0171518 A1 | 6/2014 | Vachon et al. |
| 2015/0008179 A1 | 1/2015 | Mullick et al. |
| 2015/0232627 A1 | 8/2015 | Yin et al. |
| 2016/0096936 A1* | 4/2016 | Swenor ............ B32B 27/302 53/425 |
| 2016/0228632 A1 | 8/2016 | Mullick et al. |
| 2018/0193549 A1 | 7/2018 | Mullick et al. |

FOREIGN PATENT DOCUMENTS

| | | |
|---|---|---|
| EP | 0068509 A2 | 1/1983 |
| EP | 0073978 A2 | 3/1983 |
| EP | 0231927 A2 | 8/1987 |
| EP | 0332261 A1 | 9/1989 |
| EP | 0335664 A2 | 10/1989 |
| EP | 0376674 A1 | 7/1990 |
| EP | 0571038 A1 | 11/1993 |
| EP | 0615778 A1 | 9/1994 |
| EP | 0894823 A1 | 2/1999 |
| EP | 2113298 A1 | 11/2009 |
| JP | 60-067524 | 4/1985 |
| JP | S612868 A | 10/1986 |
| JP | 62-290712 | 12/1987 |
| JP | 63-068685 | 3/1988 |
| JP | 2-258877 | 10/1990 |
| JP | 02-269725 | 11/1990 |
| JP | 02-269726 | 11/1990 |
| JP | 2000-248035 A | 9/2000 |
| JP | 2000-317275 A | 11/2000 |
| JP | 2004-248904 A | 9/2004 |
| RU | 2215012 C2 | 10/2003 |
| WO | WO-1995/26993 A1 | 10/1995 |
| WO | WO-1997/06195 A1 | 2/1997 |
| WO | WO-1998/34718 A1 | 8/1998 |
| WO | WO-1998/51725 A1 | 11/1998 |
| WO | WO-2004/056459 A1 | 7/2004 |
| WO | WO-2005/058999 A1 | 6/2005 |
| WO | WO-2007/084514 A2 | 7/2007 |
| WO | WO-2008/076345 A1 | 6/2008 |
| WO | WO-2010000746 A1 | 1/2010 |
| WO | WO-2010/025398 A1 | 3/2010 |
| WO | WO-2011/072398 A1 | 6/2011 |

OTHER PUBLICATIONS

Boyer et al., "Severe clotting during extracorporeal dialysis procedures," Seminars in Dialysis, 4(2):69-71 (1991).

(56) References Cited

OTHER PUBLICATIONS

Engelberg et al., "Physico-mechanical properties of degradable polymers used in medical applications: a comparative study." Biomaterials. 12(3):292-304 (1991).
Fang et al., "Effect of surface-modifying macromolecules and solvent evaporation time on the performance of polyethersulfone membranes for the separation of chloroform/water mixtures by pervaporation," J Appl Polym Sci. 54:1937-43 (1994).
Fang, "Separation of liquid mixtures by membranes," Department of Chemical Engineering, University of Ottawa, Canada, ON, (1996).
Goldberg, "Elastomeric polycarbonate block copolymers," Journal of Polymer Science: Part C. 4:707-730 (1963).
Hamza et al., "Development of membranes with low surface energy to reduce the fouling in ultrafiltration applications," J Membrane Sci. 131:217-27 (1997).
Ho et al., "The effect of fluorinated surface modifying macromolecules on the surface morphology of polyethersulfone membranes," J Biomater Sci. 11(10):1085-1104 (2000).
Ho, "The effects of surface modifying macromolecules on the blood compatibility of polyethersulfone membranes intended for biomedical applications," Graduate Department of Chemical Engineering and Applied Chemistry, University of Toronto (1997).
Jahangir et al., "Fluorinated surface-modifying macromolecules: modulating adhesive protein and platelet interactions on a polyetherurethane," J Biomed Mater Res. 60(1):135-47 (2002).
Jahangir et al, "The influence of protein adsorption and surface modifying macromolecules on the hydrolytic degradation of a poly(ether-urethane) by cholesterol esterase," Biomaterials. 24:121-30 (2003).
Jin et al., "Thermotropic liquid crystalline polyesters with rigid or flexible spacer groups," The British Polymer Journal. 132-146 (1980).
Kakimoto et al., "Preparation and properties of fluorine-containing polyarylates from tetrafluoroisophthaloyl chloride and bisphenols." J Poly Sci pt A: Ply Chem. 25:2747-53 (1987).
Khayet et al., "Application of surface modifying macromolecules for the preparation of membranes for membrane distillation," Desalination. 158: 51-56 (2003).
Khayet et al., "Design of novel direct contact membrane distillation membranes," Desalination 192:105-111 (2006).
Khayet et al., "Study on surface modification by surface-modifying macromolecules and its applications in membrane-separation processes," J Appl Polym Sci. 89:2902-16 (2003).
Kim et al., "Application of surface modifying macromolecules in poly(ether sulfone) ultrafiltration membranes: influence on surface morphology," Research Study, University of Ottawa and Myongji University, Korea (6 pages).
Kulesza et al., "Thermal decomposition of bisphenol a-based polyetherurethanes blown with pentane part I—thermal and pyrolytical studies." J Anal Appl Pyrolysis. 76:243-248 (2006).
La Mantia et al., "Thermo-mechanical degradation of polymer blends." Die Angewandte Makromolekulare Chemie. 216:45-65 (1994).
Liaw et al., "Curing kinetics of epoxy resins based on bisphenol-S and its derivatives." Die Angewandte Makromolekular Chemie. 200:137-46 (1992).
Liaw et al., "Curing of acrylated epoxy resin based on bisphenol-s," Polymer Engineering and Science. 34(16):1297-1303 (1994).
Liaw et al., "Radical polymerization of mono- and di-methacrylic esters containing bisphenol-s," Die Angewandte Makromolekulare Chemie. 207:43-52 (1993).
Liaw et al., "Synthesis of epoxy resins based on bisphenol-s and its derivatives," Die Angewandte Makromolekulare Chemie. 199:171-190 (1992).
Liaw, "The relative physical and thermal properties of polyurethane elastomers: effect of chain extenders of bisphenols, diisocyanate, and polyol structures," Journal of Applied Polymer Science. 66:1251-1265 (1997).
Lopez-Donaire et al., "Surface modifying oligomers used to functionalize polymeric surfaces: consideration of blood contact applications," J Appl Polym Sci. 40328:1-15 (2014).
Mahmud et al., "Evaluation of membranes containing surface modifying macromolecules: determination of the chloroform separation from aqueous mixtures via pervaporation," J Appl Polym Sci. 79:183-9 (2001).
Marks, "Interfacial synthesis and characterization of random and segmented block bisphenol A-tetrabromobisphenol A copolycarbonates." J Appl Poly Sci. 52:467-81 (1994).
Maruyama et al., "Synthesis and properties of fluorine-containing aromatic polybenzoxazoles from bis(o-aminophenols) and aromatic diacid chlorides by the silylation method," Macromolecules. 21(8):2305-2309 (1988).
Maruyama et al., "Synthesis and properties of polyarylates from 2,2-Bis(4-hydroxyphenyl)-1,1,1,3,3,3-hexafluoropropane and aromatic diacid chlorides," Journal of Polymer Science: Part A: Polymer Chemistry. 24:3555-3558 (1986).
Massa et al., "Fibrinogen adsorption and platelet lysis characterization of fluorinated surface-modified polyetherurethanes," J Biomed Mater Res. 81A:178-85 (2006).
Massa et al., "Fibrinogen surface distribution correlates to platelet adhesion pattern on fluorinated surface-modified polyetherurethane," Biomaterials. 26(35):7367-76 (2005).
McCloskey et al., "Effect of fluorinated surface-modifying macromolecules on the molecular surface structure of a polyether poly(urethan urea)," Macromolecules. 35(3):924-33 (2002).
Mitsui NOTIO™ Nano-crystal Structure Controlled Elastomer (available at www.mitsuichemicals.com/notio.htm).
Mohd-Norddin et al., "Charged surface modifying macromolecules in polymer electrolyte membrane," Jurnal Teknologi. 49(F):91-102 (2008).
Nagata et al., "Synthesis and properties of polyamides derived from systematically halogenated terephthalic acids with fluorine, chlorine, or bromine atoms," Journal of Polymer Science: Part A: Polymer Chemistry 26:235-245 (1988).
Pham et al., "Application of surface modifying macromolecules in polyethersulfone membranes: influence on PES surface chemistry and physical properties," J Appl Polym Sci. 73:1363-78 (1999).
Shimizu et al., "Synthesis and characterization of fluorine-containing aromatic polyethers from tetrafluoroisophthalonitrile and bisphenols," Journal of Polymer Science: Part A: Polymer Chemistry. 25:2385-2393 (1987).
Suk et al., "Effects of surface modifying macromolecule (SMM) on the properties of polyethersulfone membranes," Desalination. 149:303-307 (2002).
Suk et al., "Study on the kinetics of surface migration of surface modifying macromolecules in membrane preparation." Macromol. 35:3017-21 (2002).
Sukumar et al., "Synthesis and thermal studies of block copolymers from NR and MDI-based polyurethanes." J Appl Poly Sci. 111:19-28 (2009).
Tang et al., "Application of macromolecular additives to reduce the hydorlytic degradation of polyurethanes by lysosomal enzymes," Biomaterials. 18(1):37-45 (1997).
Tang et al., "Surface modifying macromolecules for improved resistance of polyurethanes to biodegradation," Canadian Biomaterials Society Meeting, Quebec City, QC (1994).
Tang et al., "Synthesis of surface-modifying macromolecules for use in segmented polyurethanes," Journ App Poly Sci. 62: 1133-45 (1996).
Tang et al., "The use of surface modifying macromolecules to inhibit biodegradation of segmented polyurethanes," Society for Biomaterials, Boston, MA (1994).
Tang et al., "Use of surface-modifying macromolecules to enhance the biostability of segmented polyurethanes," J Biomed Mater Res. 35(3):371-81 (1997).
Tang, "Surface modifying macromolecules for biomaterials," Department of Chemical Engineering, University of Ottawa (1995).
Utility U.S. Appl. No. 12/780,200, filed May 14, 2010 (103 pages).

(56) References Cited

OTHER PUBLICATIONS

International Search Report and Written Opinion issued in corresponding International Patent Application No. PCT/US2018/041718 dated Oct. 18, 2018 (15 pages).

* cited by examiner

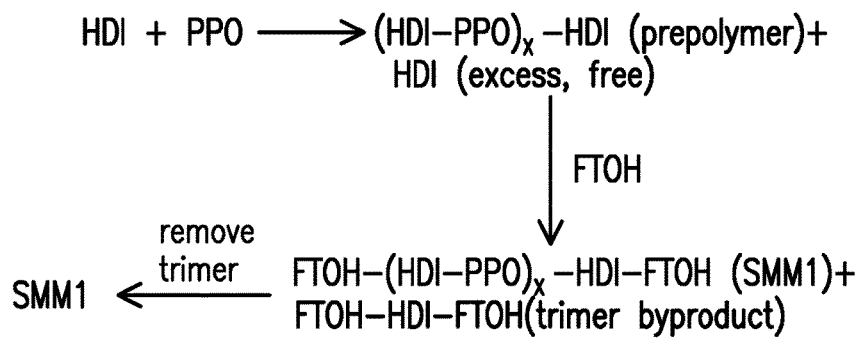
HDI=hexamethylene diisocyanate
PPO=polypropylene oxide
FTOH=1H, 1H, 2H, 2H-PERFLUORO-1-OCTANOL
SMM1:
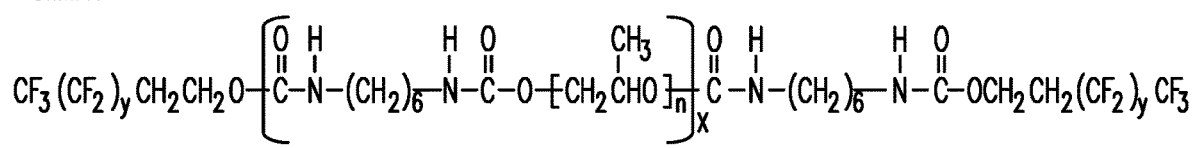
Trimer:
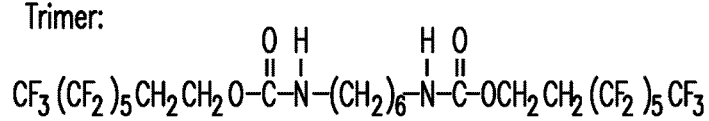
FIG. 4

METHOD FOR PROVIDING SURFACE MODIFYING COMPOSITION WITH IMPROVED BYPRODUCT REMOVAL

This application claims the benefit under 35 U.S.C. § 119(e) of prior U.S. Provisional Patent Application No. 62/532,397, filed Jul. 14, 2017, which is incorporated in its entirety by reference herein.

BACKGROUND OF THE INVENTION

The present invention relates to a method for producing surface modifying compositions (SMCs) with improved byproduct removal and their use in the manufacture of articles made therewith.

Membranes which have selective permeabilities are widely used in various products, such as filtration media used in the medical field. Membranes having a form of hollow fiber are particularly suitable for the preparation of high area per volume membranes, such as hollow fiber membranes suitable for hemodialysis, hemofiltration, or hemodiafiltration. A variety of polymers, including polysulfone, polyethersulfone, cellulose, cellulose acetate, polyamides, polyacrylonitriles, polymethyl methacrylates, polyvinyl alcohols, polyolefins, and the like, have been used to form such hollow fiber membranes.

U.S. Pat. No. 8,318,867 describes surface modifying macromolecules (SMMs) with fluorinated end groups. The '867 patent indicates that the SMMs can be used in hollow fiber membrane filtration made from polyethylene, polypropylenes, or polysiloxane base polymers for fluid or gas separation, in films and nonwoven applications, e.g., surgical drapes, gowns, face masks, wraps, bandages, and other protective wear garments for medical technicians (e.g., overalls, labcoats), and in implantable medical devices (e.g., central venous catheters). The '867 patent further shows synthesis of SMMs with fluorinated end groups, which are washed in methanol, and the polymer is then transferred to a rotary evaporator and dried. U.S. Pat. No. 8,071,683 describes synthesis of surface modifying macromolecules (SMMs) with fluorinated end groups, which are washed repeatedly with methanol, then washed twice in THF/EDTA (tetrahydrofuran/ethylene diamine tetraacetic acid) to remove residual catalyst followed by more successive washes in THF/MeOH to remove unreacted monomers, low molecular weight byproducts, and catalyst residues, and then the SMM is dried in a flow oven and then dried under vacuum. The '683 patent also describes a synthesized SMM with fluorinated end groups that is washed successively in IPA/EDTA (isopropanol/EDTA) solution followed by another wash in IPA/hexanes to remove unreacted monomers, low molecular weight byproducts, and catalyst residues to provide a polymer that is then dried under vacuum prior to use.

A need exists for surface modifying compositions produced with byproduct removed and without the need and expense of evaporating off organic solvents. The compositions are capable of improving biocompatibility of polymer surfaces.

SUMMARY OF THE PRESENT INVENTION

A feature of the present invention is to provide a method for making compositions containing surface modifying macromolecules which meet the above and/or other needs.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method that includes forming a first solution by phase transitioning to a liquid state at least a portion of a surface modifying composition comprising a) polymer or oligomer, and b) an insoluble reaction byproduct of i) a fluorotelomer alcohol and ii) an isocyanate, wherein the insoluble reaction byproduct is substantially insoluble in the polymer or oligomer, and removing from the first solution at least a portion of the insoluble reaction byproduct present in the first solution to obtain a second solution, wherein the polymer or oligomer is a polymer or oligomer backbone covalently attached to at least one surface active group.

The present invention further relates to a method, comprising forming a first solution by dissolving in dimethylacetamide (DMAC) at least a portion of a surface modifying composition comprising a) polymer or oligomer, and b) insoluble reaction byproduct of i) a fluorotelomer and ii) an isocyanate, wherein the insoluble reaction byproduct is substantially insoluble in DMAC, and removing from the first solution at least a portion of the insoluble reaction byproduct present in the first solution to obtain a second solution, wherein the polymer or oligomer is a polymer or oligomer backbone covalently attached to at least one surface active group.

It is to be understood that both the foregoing general description and the following detailed description are exemplary and explanatory only and intended to provide a further explanation of the present invention, as claimed.

BRIEF DESCRIPTION OF DRAWINGS

FIG. 4 shows a reaction scheme for synthesizing a surface modified macromolecule (SMM1), wherein the SMM1 product can be isolated from trimer byproduct of the reaction scheme using a method according to an example of the present application.

DETAILED DESCRIPTION OF THE PRESENT INVENTION

Figure 1:
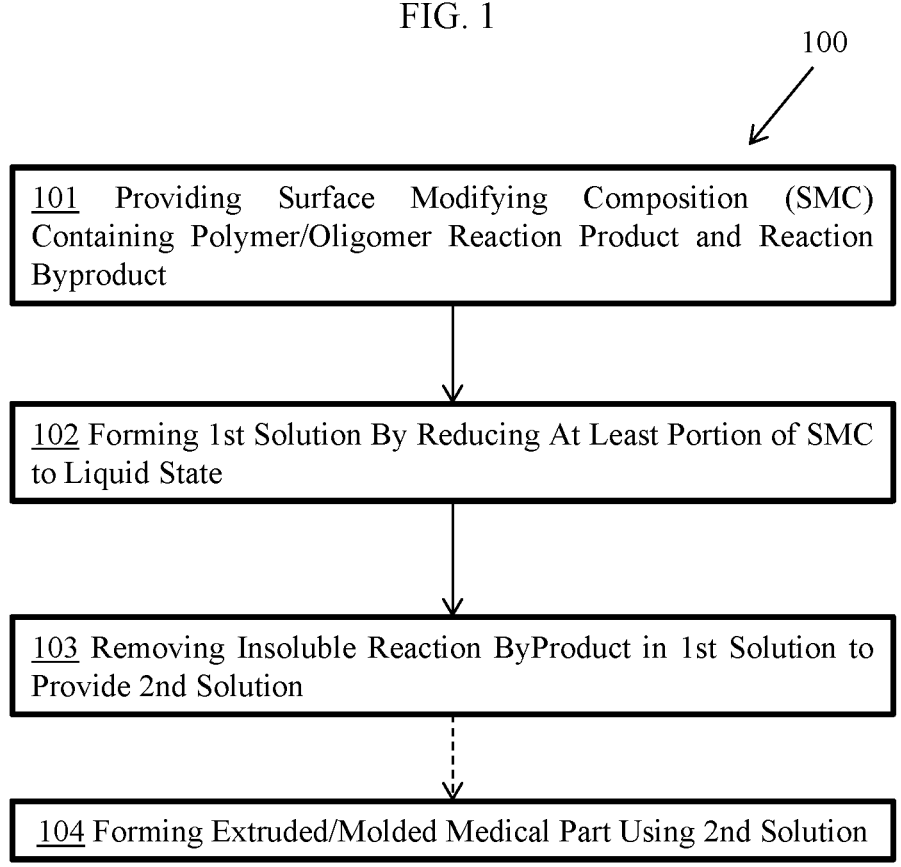
FIG. 1 is a process flow diagram of a method of production of a surface modifying composition containing polymer/oligomer reaction product with insoluble reaction byproduct removal, wherein the resulting surface modifying composition can be used in medical part formation, according to an example of the present application.

A method is disclosed for providing surface modifying compositions (SMCs) with reaction byproduct removal without need of solvent evaporation. The resulting surface modifying compositions can be used directly in making products. The resulting purified surface modifying compositions can be used to improve the bio-compatibility of surfaces of products made therewith. The present invention can provide a method for removing the reaction byproducts from the synthesis of surface modifying compositions, such as surface modifying macromolecules (SMMs), that does not involve organic solvent washes and/or the need to evaporate off the solvent wash. The need for energy intensive and costly processes for solvent evaporation can be eliminated by the method of the present invention. The disclosed method can provide a solution that can be formed into articles having improved surface properties, such as extruded or molded medical articles (e.g., spun hollow fiber).

As used herein, "surface modifying" refers to a composition or material that comprises a "surface modifier" compound, such as surface modifying macromolecules (SMMs), described herein or in U.S. Pat. Nos. 6,127,507, 8,071,683, and 8,318,867, all of which are incorporated in their entireties by reference herein. A surface modifier can also be described as a polymer or oligomer backbone covalently attached to at least one surface active group. A "surface active group" refers to a lipophilic group covalently tethered to a surface modifier.

In a method of the present invention, a first solution can be formed by phase transitioning at least a portion of a surface modifying composition to a liquid state, wherein the surface modifying composition comprises polymer or oligomer reaction product that is a surface modifier and insoluble reaction byproduct, and removing at least a portion of the insoluble reaction byproduct present in the first solution to obtain a second solution which contains the polymer or oligomer reaction product in purified form or at a higher concentration. For purposes of the present invention, 'phase transitioning' can be considered transitioning without necessarily having a change of phase or physical state for the polymer or oligomer reaction product. Many times, the starting surface modifying composition is a solid (e.g., a paste or powder) at room temperature (e.g., 20 to 25 deg C.). As used herein, 'phase transitioning' is or can include changing, converting, or maintaining a first portion of the surface modifying composition in a liquid state such that a different portion of the surface modifying composition is or remains insoluble (e.g., is or remains in a solid state) or has a different density, viscosity, or other difference to permit separation from the first portion. As a specific example, the polymer or oligomer reaction product is or converts to or changes to or transitions to or maintains a liquid state while the insoluble reaction byproduct or portion thereof is a solid or does not convert or does not change or does not transition to a liquid state. Phase transitioning as described herein can be achieved by any means such as selectively using a solvent that changes the desired polymer or oligomer reaction product to a liquid (e.g., the selective solvent dissolves or renders more soluble the desired polymer or oligomer reaction product while not doing so to the insoluble reaction byproduct or portion thereof). Phase transitioning as described herein can also be achieved, for example, by selectively melting such as selectively heating to a certain temperature(s) such that the desired polymer or oligomer reaction product becomes a liquid (i.e., the selective melting changes to a liquid state the desired polymer or oligomer reaction product while not doing so to insoluble reaction byproduct or portion thereof). If the surface modifying composition is a liquid initially, the opposite approach can be done, that is, the surface modifying composition can be subjected to temperatures to selectively have the desired polymer or oligomer in a physical state different (i.e., different state of matter or phase) from the unwanted reaction by-product or portion thereof. The polymer or oligomer reaction product can be a material that is capable of improving the bio-compatibility, e.g., hemo-compatibility of a polymer surface. The material can be a SMM (Surface Modifying Macromolecule) or a SMA (Surface Modifying Additive). The polymer or oligomer can be a polymer or oligomer backbone covalently attached to at least one surface active group. The insoluble reaction byproduct can be removed by selectively putting the polymer or oligomer reaction product in a liquid state, whereas the reaction byproduct is/remains insoluble with respect to the polymer or oligomer and other parts of the SMC, and separating the polymer or oligomer phase from insoluble byproduct phase in the liquid SMC. This removal of the insoluble reaction byproduct from the surface modifying compositions can comprise use of selective solubility in solvent, selective thermal melting, or other methods, which selectively place the desired polymer or oligomer reaction product in a liquid state but not the undesired reaction byproduct. Separation of the material in the liquid state from the insoluble solid byproduct material can be done by filtration, centrifugation, decantation or other liquid-solid separation methods. As used herein, "purified" can refer to a surface modifier-containing portion of a surface modifying composition that has been isolated from insoluble reaction byproduct present therein.

As an option, a solvent can be used to dilute the polymer or oligomer reaction product to a level sufficient for the polymer or oligomer reaction product to be passable through a microporous filter while trapping the insoluble reaction byproduct at/in a filter. The term "solvent" is used herein in its usual meaning, wherein it indicates a substance capable of dissolving another substance (solute) to form a uniformly dispersed mixture thereof at the molecular level that is in a liquid or flowable state. As a preferred option, the solvent that can be used to selectively dissolve the polymer or oligomer reaction product can be an organic solvent which also useful for forming a spinning dope or has other functionality useful in a product fabrication stage downstream from surface modifier purification.

As another option, the SMC can be heated to a temperature at which a portion thereof comprising the polymer or oligomer melts to a liquid state while the reaction byproduct remains insoluble, and the polymer or oligomer in the liquid form can be separated from the insoluble unmelted reaction byproduct, such as by filtering, decanting or any other liquid-solid separation method.

Referring to FIG. 1, a process according to an example of the present application, indicated by the identifier 100, includes steps 101, 102, and 103, and step 104 is an additional step that may be included. In step 101, as an option, a surface modifying composition (SMC) can be provided that comprises the reaction solution in which the desired polymer or oligomer ("polymer/oligomer") reaction product was formed, which still includes undesired reaction byproduct. The desired polymer/oligomer reaction product can have central polymeric portion and surface active groups. As an option, the central polymeric portion may have a polyurethane backbone, which has a structure that depends on the type of isocyanate and polyol used, or other polymeric structure to which at least one or more surface active groups are attached. As examples, use of a diisocyanate with six carbons, (e.g., hexamethylene diisocyanate or HDI) can create a linear backbone structure, whereas a tri-isocyanate can create a branch-polymer backbone structure. The surface active group can be positioned to cap one or both termini of a central polymeric portion of the polymer/oligomer or can be attached to one or more side chains present in the central polymeric portion of the polymer/oligomer. Examples of surface active groups include, without limitation, polyfluoroalkyl, fluoroalkoxyl, fluorinated polyethers, polydimethylsiloxanes, hydrocarbons, and combinations thereof. The desired polymer/oligomer reaction product may have a molecular weight (number average or weight average) of from about 2,000 to about 20,000, or from about 5,000 to about 15,000, or from about 4,000 to about 15,000, or from about 8,500 to about 20,000, or from about 8,500 to about 10,000, or other values. For purposes of this application, the molecular weight of the polymer/oligomer is determined as a relative molecular weight with respect to polystyrene standard, wherein molecular weight of the polymer/oligomer is determined by comparing the result of the sample obtained from gas permeation chromatography (GPC)/size exclusion chromatography (SEC) with that of standard known molecule weight polystyrene.

In step 102 of FIG. 1, a first solution is formed by phase transitioning at least a portion of the SMC that includes the polymer/oligomer reaction product to a liquid state. As indicated, this transition to a liquid state can be accomplished with selective solvent or melting with regard to the polymer/oligomer reaction product and insoluble reaction byproduct. In step 103, the insoluble reaction byproduct in the first solution is at least partly or fully removed to provide a second solution in which the polymer/oligomer reaction product reaction product is isolated or of a higher concentration. The removal of insoluble byproduct can be done by filtration, centrifugation, decantation, or other liquid-solid separation methods. In step 104, the resulting second solution can be directly used in forming an extruded or molded medical part or other articles.

Figure 2:
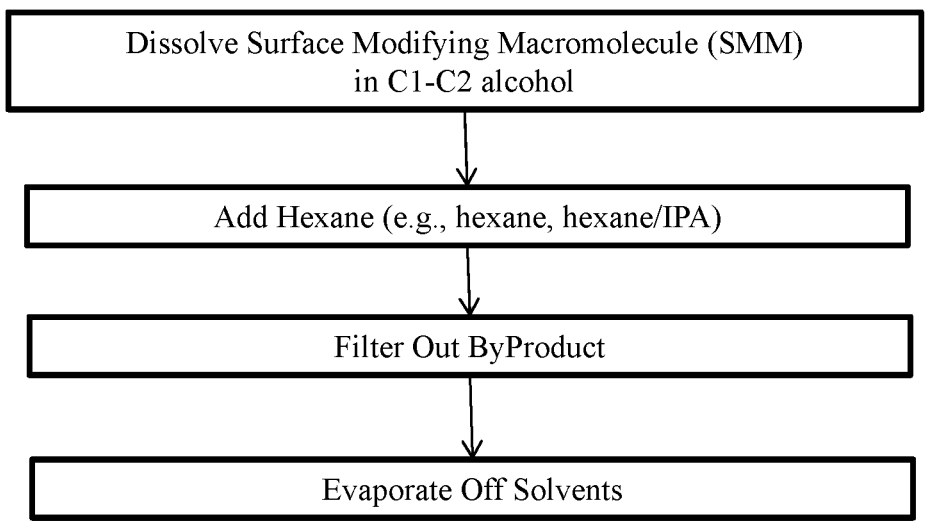
FIG. 2 is a process flow diagram of a conventional method of production of a surface modifying macromolecule with evaporation of solvent.

For comparison, FIG. 2 shows a prior process for isolating surface modifying macromolecules (SMM) from a reaction solution, wherein the SMM is dissolved in methanol or ethanol, and hexane or a mixture of hexane and other organic solvent (e.g., isopropanol) is added, and the byproduct is filtered out of the SMM-containing composition that also contains the alcohol, hexane, and any other organic solvents, and then the alcohol and organic solvents must be evaporated off the SMM containing composition. This process is costly and includes the energy intensive process of solvent evaporation.

Figure 3:
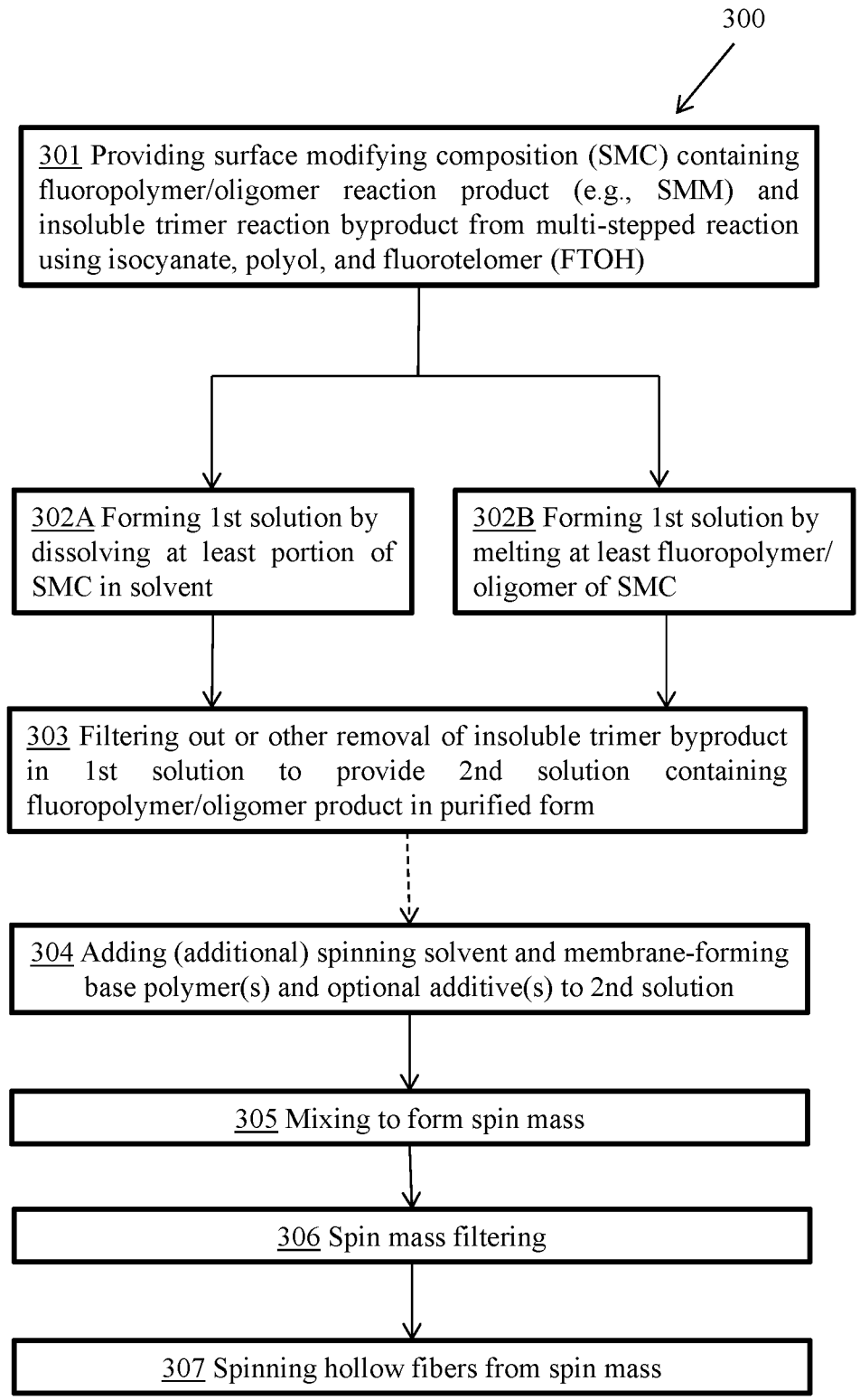
FIG. 3 is a process flow diagram of a method of production of a surface modifying composition containing fluoropolymer/oligomer product with removal of insoluble reaction byproduct, wherein the resulting surface modifying composition is directly used in hollow fiber production, according to an example of the present application.

FIG. 3 shows a process according to a more specific example of the present application, indicated by the identifier 300, including steps 301, 302A or 302B, 303, 304, 305, 306 and 307. In the process of FIG. 3, the polymer/oligomer reaction product is shown as a fluoropolymer/oligomer reaction product. In step 301, a surface modifying composition (SMC) containing fluoropolymer/oligomer reaction product and insoluble trimer reaction byproduct, which can be formed from a multi-step reaction of excess isocyanate, polyol or other polyurethane-forming co-monomer, and fluorotelomer alcohol (FTOH). The generation of the undesired trimer byproduct in the reaction scheme can be appreciated from the example of the reaction chemistry shown in FIG. 4. In the example shown in FIG. 4, a diisocyanate, i.e., hexamethylene diisocyanate or HDI) can be reacted with a polyol, e.g., polypropylene oxide (PPO), with the HDI in molar excess to form a prepolymer (i.e., $(HDI-PPO)_x-HDI$), and that reaction solution is further reacted with fluorotelomer alcohol (FTOH) in molar excess to form a surface modifying macromolecule (SMM), which is shown as SMM1. The SMM has a linear polyurethane backbone structure (e.g., x is 1 or more and n is 1 or more, e.g., x is 1 and n is 1 to 18), which is end-capped at both ends with fluoroalkoxyl groups (e.g., y is 2-10). Excess HDI is used to ensure that the prepolymer is terminated with HDI. FTOH, in molar excess, is added to react with the terminal HDI groups in the prepolymer. However, in view of the presence of excess HDI during the reaction of the prepolymer and excess FTOH, a trimer byproduct (FTOH-HDI-FTOH) is co-formed. This trimer byproduct can have a structure, such as shown in FIG. 4, which is a fluoroalcohol end capped di-urethane. This trimer can be substantially free (e.g., <3 wt %, or <2 wt %, or <1 wt %) or completely free (0 wt % or below detectable levels) of polyol monomer. This trimer byproduct can be substantially insoluble (e.g., <2 wt %, or <1 wt %, or <0.1 wt %) or completely insoluble in the fluoropolymer/oligomer reaction product.

As an option, a surface modifying composition can be a reaction solution that is obtained from the synthesis of the SMMs, which can contain two major components as reaction product material, which can be from about 50 wt % to about 99 wt % fluoropolymer/oligomer reaction product and from about 1 wt % to about 50 wt % reaction byproduct, and specifically can be from about 75 wt % to about 95 wt % fluoropolymer/oligomer reaction product and from about 25 wt % to about 5 wt % reaction byproduct, or other amounts, based on the total weight of the surface modifying composition (prior to any selective solvent or melting treatment). For the reaction chemistry of SMM1 synthesis illustrated in FIG. 4, the reaction solution can contain the two major components as reaction product material according to the above range amounts, and more specifically can be from about 85 wt % to about 90 wt % fluoropolymer/oligomer reaction product (e.g., about 87 wt %) and from about 10 wt % to about 15 wt % trimer reaction byproduct (e.g., about 13 wt %). The ratio of wt % of the fluoropolymer/oligomer reaction product to a wt % of the reaction byproduct in the reaction solution (i.e., the surface modifying composition prior to any selective solvent or melting treatment) can be in the range of from about 1:1 to about 99:1, or from about 2:1 to about 9.5:1, or from about 3:1 to about 9:1, respectively, or other ratios thereof.

As indicated, the trimer byproduct is undesirable. The method of the present invention, such as illustrated in FIG. 3, provides a process for removing the trimer byproduct from a surface modifying composition to isolate the desired SMM1 or other SMM therein from the trimer byproduct without need of use of solvent wash and solvent evaporation. In this respect, steps 302A and 302B show two options for forming a first solution that comprises surface modifying composition in a fluid state containing the insoluble reaction byproduct. Based on total weight of the first solution, the first solution can contain the surface modifying composition in an amount of from about 10 wt % to about 100 wt %, or from 85 wt % to about 99.99 wt %, or from about 95 wt % to about 99.99 wt %. Based on total weight of the first solution, the first solution can contain SMM in a total amount of from about 10 wt % to about 99.99 wt %, or from 85 wt % to about 99.99 wt %, or from about 95 wt % to about 99.99 wt %. The surface modifying composition can comprise all or essentially all of the non-solvent components present in the first solution.

In option 302A shown in FIG. 3, a first solution is formed by dissolving at least a portion of the surface modifying composition (SMC) in a solvent that selectively or preferentially dissolves the SMM1 or other desired SMM product as compared to the undesired trimer byproduct or other reaction byproduct. This process step can take advantage of the poor solubility of trimer byproduct in some solvents and the excellent solubility of fluoropolymer/oligomer product in the same solvent. As an option, the surface modifying composition can be the only non-solvent component present in the first solution. The trimer byproduct is not a fluoropolymer or oligomer with two or more repeating units in a polyurethane backbone. The trimer is highly fluorinated relative to a single HDI unit at the central portion thereof. The trimer can have very low solubility in some organic solvents, such as polar aprotic solvents, as compared to the fluoropolymer/oligomer reaction product. As an option, organic solvents which can be used as a selective solvent for the fluoropolymer/oligomer reaction product relative to the trimer byproduct can be dimethylacetamide (DMAC), N-methylpyrrolidone (NMP), dimethylsulfoxide (DMSO), tetrahydrofuran (THF), N-ethylpyrrolidone, N-octylpyrrolidone, dimethylformamide (DMF), butyrolactone, or other solvents, or any combination thereof. As a preferred option, the solvent comprises DMAC. As an option, the first solution can contain DMAC in an amount from about 0 wt % to 90 wt %, or from about 0.01 wt % to about 15 wt %, or from about 0.01 wt % to about 5 wt %, based on total weight of the first solution. As an option, the first solution can contain one solvent or two or more different solvents that are capable of dissolving the fluoropolymer/oligomer reaction product. As an option, the first solution can contain DMAC as solvent in an amount from about 1 wt % to 99.9 wt %, or from about 1 wt % to about 50 wt %, or from about 5 wt % to about 25 wt %, based on total weight of solvent present in the first solution. As a preferred option, DMAC is the only solvent present in the first solution (i.e., the solvent present is 100% DMAC). As an option, a total weight of DMAC and surface modifying composition present in the first solution based on total weight of the first solution can be in a range of from about 0 wt % to 100 wt %, or from 0 wt % to about 75 wt %, or from about 0 wt % to about 20 wt %, or from about 1 wt % to about 50 wt %, or from about 1 wt % to about 20 wt %, or from about 5 wt % to about 20 wt %.

The trimer byproduct preferably is substantially insoluble in a surface modifying composition that is treated with the selective solvent, whereas the fluoropolymer/oligomer reaction product is substantially soluble therein. For purposes herein, the term "substantially insoluble" as used to describe the solubility of the reaction byproduct in the surface modifying composition that contains the reaction solution and added selective solvent, means that no more than 10 wt % (e.g., 0 to 10 wt %) of the reaction byproduct is soluble in the solvent-treated SMC. As an option, the solvent can be selected wherein the reaction byproduct, such as the trimer byproduct, has a solubility in the solvent of no more than about 10 wt %, or no more than about 5 wt %, or no more than about 2 wt %, or no more than 1 wt %, or other low solubilities therein. The fluoropolymer/oligomer reaction product can be highly soluble in the same solvent, such as at least about 90 wt %, or at least 95 wt %, or at least 98 wt % soluble, or at least 99 wt % soluble, or other high solubilities therein.

In option 302B shown in FIG. 3, a first solution is formed by thermally treating a surface modifying composition which contains fluoropolymer/oligomer reaction product and trimer byproduct or other reaction byproduct, such that the fluoropolymer/oligomer product (e.g., SMM) is transitioned, such as by melting, to a less viscous or liquid state and the reaction byproduct remains insoluble therein. This can be done where the fluoropolymer/oligomer product (e.g., SMM) has a lower softening temperature, lower melting temperature, or both, relative to the reaction byproduct (e.g., trimer). No addition of solvent is needed for this approach to selectively decrease the SMM viscosity with respect to the reaction byproduct.

In step 303, the insoluble trimer byproduct can be filtered out or otherwise separated from the fluoropolymer/oligomer product in the solution to which the selective solvent was added in step 302A, if used instead of step 302B, to provide another solution in which the fluoropolymer/oligomer product is present in a more purified form. As a preferred option for step 302A, a selective solvent, e.g., DMAC, can be used to dilute the SMM (e.g., SMM1) in the surface modifying composition to a level just enough for the SMM to be pushed through a filter, such as a membrane filter, while trapping the insoluble trimer in the filter. As used herein, "filtration" is a mechanical method to separate solids (e.g., insoluble trimer reaction byproduct from reaction of excess isocyanate reactant and fluorotelomer alcohol) from liquids (e.g., SMMs and any solvent) by passing the feed stream through a microporous membrane or other porous structure, which retains the solids and allows the liquids to pass through. For use of step 302A, the content of the filtered-SMM can depend on the amount of solvent used. As an option, about 0.3× to about 0.5× solvent (per 1×SMM), or from about 0.35× to about 0.45× solvent (per 1×SMM), or from about 0.4× solvent (per 1×SMM), e.g., about 0.4×DMAC (per 1×SMM1), can be used to dissolve the SMM in the surface modifying composition (e.g., a reaction solution). Additional use of DMAC may make it easier to filter the surface modifying composition, but may also increase the trimer content carried over into the solution that passes through the filter. The filtered SMM (e.g., SMM1) solution, already in solvent (e.g., DMAC), can be used directly to make spinning dope or other polymer-containing masses that are extrudable or moldable into articles.

As an option, a filter, if used for separation of insoluble reaction byproduct from solution containing the fluoropolymer/oligomer reaction product, can be a membrane, such as a microporous membrane. Where step 302A is used before filtration in step 303, the membrane preferably has good resistance to the organic solvent used and a low level of extractables. As an option, where step 302A is used, a membrane material used in filter step 303 can be an organic polymer, such as fluoropolymer or aromatic polymer which has these properties. As an option, the fluoropolymer membrane material can be based on a copolymer of ethylene and chlorotrifluoroethylene (ECTFE), polytetrafluoroethylene (PTFE), or similar materials. ECTFE membrane materials are available as HALAR® from Solvay. The membrane filter material can be, as other options, a microporous metallic material (e.g., stainless steel) or ceramic material. Porous membrane structures are generally classified according to their effective pore size or according to their retentiveness, i.e., the sizes of particles that are not able to pass through the pores of the porous membrane structure. Thus, for example, the structures used as filters have been classified as ultrafilters if they retain dissolved matter such as ions, proteins viruses or soluble macromolecules, while they are classified as microporous structures if they pass dissolved matter and retain only undissolved particles. By this categorization, the filter used in the present invention can be a 'microporous' structure as the membrane preferably retains insoluble particles of reaction byproduct and allows soluble reaction products, such as soluble SMMs, to pass through the membrane. As an option, a microporous structure used in the method of the present invention can have an average pore size of from about 0.05 micrometers to about 10 micrometers (µm). The porous membranes can be described as a pore volume and a solid matrix separated by a pore wall. The membranes can be flat sheet membranes or other structures. Porous structures used as membrane filters may have a pore size difference at their two surfaces, i.e., as isotropic or symmetric when the two surfaces have similar pore size, and anisotropic or asymmetric when the two surfaces have different pore sizes. A positive pressure can be used to intrude solvent-treated reaction solution into the pores of membranes to displace the existing air or flowable liquid content therein.

As an option where step 302B is used, the separation of the less viscous part of the SMC containing the fluoropolymer/oligomer product (e.g., SMM) from the solid trimer byproduct can be done by filtration with use of a filter formed of a material that can tolerate the temperature(s) to which the SMC is heated to selectively phase transition the fluoropolymer/oligomer product (e.g., SMM) content. In this respect, the membrane filter material can be, as an option, a microporous metallic material (e.g., stainless steel), ceramic, or organic polymer material having a softening and melting point that are higher than those of the fluoropolymer/oligomer product (e.g., SMM), or other heat tolerant microporous membrane materials. As another option, the heated reaction solution can be rested (non-agitated) long enough to permit the insoluble byproduct to settle at or near the bottom of a container that holds the fluid mixture, and then decanting off the less viscous part of the mixture that contains the fluoropolymer/oligomer product (e.g., SMM).

The separation and removal in step 303 of the insoluble trimer byproduct from the fluoropolymer/oligomer product in the solution of step 302A or 302B provides another surface modifying composition solution in which the fluoropolymer/oligomer product is present in a more purified form as compared to the solution before the filtration or other liquid-solid separation step. An advantage of the present invention is that the solution obtained from the filtration or other liquid-solid separation step can be directly used in further processing related to production of an extruded or molded part, such as shown in steps 304, 305, 306, and 307 with regard to production of spun hollow fibers, which can be used, e.g., in filtration membranes for hemodialysis, or other types of articles can be made therewith.

As an option, the removal of the reaction byproduct, such as the trimer byproduct, from the surface modifying composition removes from about 1 wt % to 100 wt %, or from about 10 wt % to about 100 wt %, or from about 50 wt % to about 100 wt %, or from about 75 wt % to about 100 wt %, or from about 90 wt % to about 100 wt %, or from about 95 wt % to about 100 wt %, of a total weight of the insoluble reaction byproduct present in the solution (based on the weight before any solvent addition and liquid-solid separation). The content of the reaction byproduct, such as the trimer byproduct, in the solution that has been solvent or thermally treated, and filtered or otherwise subjected to liquid-solid separation, according to a method of the present invention can be reduced down to about 5 wt % or less (e.g., 0-5.0 wt %), or about 1.0 wt % or less, or about 0.8 wt % or less, or about 0.5 wt % or less, or about 0.25 wt % or less, or 0.1 wt % or less, or other reduced amounts, based on the total weight of the solution that has been solvent or thermally treated, and filtered or otherwise subjected to liquid-solid separation. The polymer or oligomer reaction product can be present in an amount of from about 5 wt % to about 99.9 wt %, or from about 10 wt % to about 99.9 wt %, or from about 50 wt % to about 99.9 wt %, or from about 75 wt % to about 99.9 wt %, or from about 90 wt % to about 99.9 wt %, based on total weight of the solution that has been solvent or thermally treated, and filtered or otherwise subjected to liquid-solid separation. In the solution that has been solvent treated or melted, and filtered or otherwise subjected to liquid-solid separation second solution, a ratio of wt % of the polymer or oligomer to wt % of the insoluble reaction byproduct based on total weight of the solution can be in a range of from about 50:1 to about 999:1, or from about 75:1 to about 750:1, or from about 100:1 to about 500:1.

In step 304, additional solvent (for spinning) to solvent added in step 302A, if used, can be added, together with one or more membrane-forming base polymers and optional additives. The mixing, filtering, and spinning steps used in making the spun hollow fibers can be adapted from methods and equipment generally used for these types of steps in the industry, such as shown in U.S. Pat. Nos. 9,353,220, 8,784, 664, and 6,113,785, and U.S. Patent Appln. Publ. No. 2006/0205309, all of which are incorporated in their entireties by reference herein. The spinning dope can be prepared by combining the solution obtained after removal of the insoluble reaction byproduct with an additional amount of solvent, such as DMAC, to obtain a diluted solution with a base polymer to obtain an admixture that can be filtered to obtain the spinning dope. The base polymer can be, as an option, at least one of polysulfone (PSF), polyethersulfone (PES), polyarylsulfone (PAS), polyarylethersulfone (PAES), polyvinylidene fluoride (PVDF), polyacrylonitrile (PAN), or any copolymer thereof. Hydrophilic monomers may be included, as an option, such as polyvinylpyrrolidone, polyethylene glycol, or combinations thereof. The diluted solution can contain, as an option, DMAC in an amount of from about 50 wt % to about 99 wt %, or from about 50 wt % to about 75 wt %, or from about 69 wt % to about 95 wt %, or from about 65 wt % to about 90 wt %, based on total weight of the diluted solution. The diluted solution can contain DMAC in an amount of from about 1 wt % to 100 wt %, or from about 10 wt % to about 100 wt %, or from about 25 wt % to about 100 wt %, or from about 50 wt % to about 100 wt %, or from about 75 wt % to about 100 wt %, or from about 90 wt % to about 100 wt %, based on total weight of solvent present in the diluted solution. As an option, DMAC can be the only solvent present in the diluted solution. The total weight of DMAC and surface modifying composition present in the diluted solution based on total weight of the diluted solution can be, as an option, in a range of from about 50 wt % to 100 wt %, or from about 60 wt % to about 99 wt %, or from about 70 wt % to about 95 wt %, or from about 75 wt % to about 90 wt %. As an option, the diluted solution can contain the surface modifying composition in an amount of from about 0.1 wt % to about 15 wt %, or 0.5 wt % to about 15 wt %, or from about 1 wt % to about 15 wt %, or from about 3 wt % to about 12 wt %, based on total weight of the diluted solution. The diluted solution can contain, as an option, the surface modifying composition in an amount of from about 0.1 wt % to 100 wt %, or from about 1 wt % to about 100 wt %, or from about 10 wt % to about 99 wt %, or from about 25 wt % to about 99 wt %, or from about 50 wt % to about 95 wt %, or from about 60 wt % to about 90 wt %, based on total weight of non-solvent components present in the diluted solution. The spinning dope can be wet spun or dry spun into hollow fibers of dialysis grade or other products.

Figure 5:
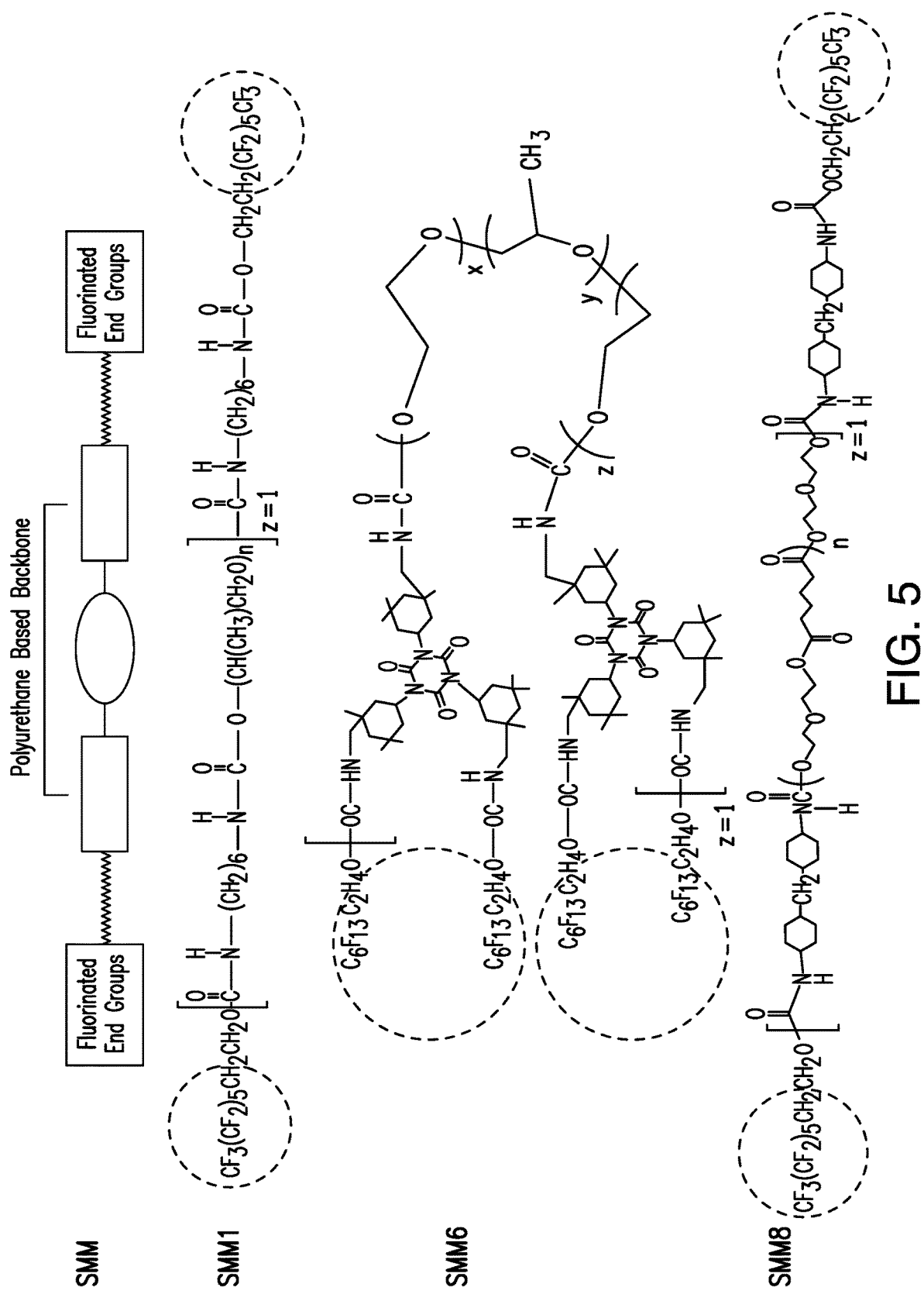
FIG. 5 shows a general chemical structure of a surface modified macromolecule (SMM), and specific chemical structures of surface modified macromolecules (SMM1, SMM6, and SMM8), which can be isolated from reaction byproduct using a method according to an example of the present application.

FIG. 5 shows a general chemical structure of an SMM and several specific SMMs (SMM1, SMM6, SMM8) that can be isolated from reaction byproduct using a method of the present invention. In SMM6, x and y each is 1 or more, and in SMM8, n is 1 or more. Other SMMs in surface modifying compositions that contain reaction byproduct can be processed according to the present invention as well, such as SMM2, SMM3, SMM4, SMM5, SMM7, SMM8, SMM9, SMM10, SMM11, SMM12, SMM13, or SMM14, or any combination thereof. Synthesis methods for foisting these SMMs and others are shown, for example, in incorporated U.S. Pat. Nos. 8,071,683, and 8,318,867, with the modification that the reaction solutions are not washed with organic solvent and the solvent evaporated, and instead, a byproduct removal process of the present invention is used on the reaction product.

As an option, the SMMs that are purified by methods of the invention can be constructed by appropriate design combinations of the isocyanates (e.g., diisocyanates or triisocyanates), polyols, and fluoroalcohol monomers to form a wide range of polyurethanes employing catalysts in the polymerization. These reactants for synthesizing the SMMs can include, but are not limited to, the component reagents mentioned below. With respect to the isocyanates, diisocyanates can be used which can be one or more of HDI=hexamethylene diisocyanate, HMDI=4,4'-methylene bis(cyclohexyl isocyanate), IPDI=isophorone diisocyanate, TMXDI=m-tetramethylene xylene diisocyanate, or others, and/or triisocyanates which can be one or more of HDI isocyanurate, IPDI trimer isocyanurate, or others, or any combinations thereof. The polyols can be one or more of PPO=polypropylene oxide, HLBH=hydrogenated-hydroxyl terminated polybutadiene, PCN=poly (2,2 dimethyl-1-3-propylcarbonate) diol, PHCN=poly(hexamethylene carbonate)diol, PEB=poly(ethylene-co-butylene)diol, LBHP=hydroxyl terminated polybutadiene polyol, PEGA=poly(diethylene glycol)adipate, PTMO=poly(tetramethylene oxide) diol, PDP=diethylene glycol-ortho phthalic anhydride polyester polyol, SPH=1,6-hexanediol-ortho phthalic anhydride polyester polyol, SPN=Neopentyl glycol-ortho phthalic anhydride polyester polyol, BPAE=bisphenol A ethoxylate diol, or others, or any combinations thereof. The fluorinated end-capping groups can be derived from one or more fluorotelomer alcohols (FTOHs). The fluorotelomer alcohol can have the structure $F(CF_2)_z$—$CH_2CH_2$—OH where z=4, 6, 8, 10 or 12 or other values of z, or $F(CF_2)_z$—$CH(CH_3)$—OH, where z=5, 7, 9 or 11 or other values of z. As an option, the fluorotelomer alcohol (FTOH) can be 4:2 FTOH, 5:2 FTOH, 6:2 FTOH, 7:2 FTOH, 8:2 FTOH, 9:2 FTOH, 10:2 FTOH, or other FTOHs, or any combination or mixture thereof. In a preferred option, the fluorotelomer alcohol can be 1H,1H,2H,2H perfluoro-1-octanol (6:2 FTOH), 1H,1H,2H,2H perfluorodecanol, 1H,1H,5H-perfluoro-1-pentanol, 1H,1H perfluorobutanol, or any mixture of these. In a more preferred option, the fluorotelomer is 6:2 FTOH (1H,1H,2H,2H-perfluoro-1-octanol). The polymerization catalyst can be a non-tin based catalyst, such as a bismuth catalyst, e.g., a bismuth carboxylate catalyst, or other catalysts.

The present invention will be further clarified by the following theoretical example, which is intended to be exemplary of the present invention. In this non-limiting illustration, a method of the present invention is carried out according to the process scheme shown in FIG. 3. General synthesis schemes for synthesizing SMMs shown in the incorporated U.S. Pat. Nos. 8,071,683 and 8,318,867 can be adapted as indicated herein to synthesize various SMMs. To synthesize SMM1, for example, a polyol, such as polypropylene oxide, can be reacted with a diisocyanate, such as HDI, in molar excess (e.g., mole HDI>mole PPO of), at about 60-75° C. in an organic solvent (e.g., dimethylacetamide (DMAC) or toluene) in the presence of a catalyst (e.g., a bismuth catalyst) to form a prepolymer. The ends of the prepolymer can then be capped with a perfluorotelomer alcohol (FTOH), in molar excess (e.g., mole FTOH>mole prepolymer), at about 40-50° C. Because the reactions can be moisture sensitive, the reactions preferably are carried out under a nitrogen atmosphere under anhydrous conditions. SMM1 in the resulting reaction solution (if synthesis is performed in DMAC as solvent) can be precipitated by addition of water, or if the reaction is performed in toluene, SMM1 in the resulting reaction solution can be precipitated by addition of methanol. The chemical structure of the SMM1 is shown FIG. 4. A reaction solution containing about 87 wt % SMM1 and about 13 wt % trimer can result from this multi-step reaction scheme. The precipitated SMM1 does not need to be washed in hexane or other organic solvents that would need to be evaporated off. Instead, the SMM1 can be selectively dissolved in DMAC or other solvent, such as added at a proportion of 0.4× DMAC per 1×SMM1, to the reaction solution, wherein the SMM1 is substantially dissolved in the added solvent (e.g., >98 wt % dissolved), whereas the trimer byproduct is substantially insoluble in the added solvent (e.g., <2 wt % solubility). The trimer byproduct can be filtered out of the solvent-treated reaction solution by use of a microporous membrane having an average pore size between about 0.05 micrometers and about 10 micrometers (µm), which allows the dissolved SMM1 to completely pass through under positive pressure provided at the inlet side of the membrane. The solution that passes through the membrane can be directly used in spinning dope formulation and spinning of hollow fibers therein. To provide a spinning dope, the solution that passes through the membrane can have additional solvent added (e.g., about 71×DMAC per 1×SMM1 or other amounts such as indicated herein), and membrane-forming polymers, such as polysulfone and polyvinylpyrrolidone (PVP) or others, are further added. The resulting combination can be mixed, filtered, and spun into hollow fibers using methods and equipment generally used for these types of steps in the industry and disclosed in the incorporated patents.

The present invention includes the following aspects/embodiments/features in any order and/or in any combination:

1. The present invention relates to a method comprising:
    forming a first solution by phase transitioning at least a portion of a surface modifying composition to a liquid state, the surface modifying composition comprising:
    a) at least one polymer or oligomer, and
    b) an insoluble reaction byproduct of i) a fluorotelomer alcohol and ii) an isocyanate, wherein said insoluble reaction byproduct is substantially insoluble in said polymer or oligomer; and
    removing from the first solution at least a portion of said insoluble reaction byproduct present in the first solution to obtain a second solution;

wherein said polymer or oligomer comprises a polymer or oligomer backbone covalently attached to at least one surface active group.

2. The method of any preceding or following embodiment/feature/aspect, wherein said first solution is formed by dissolving at least a portion of said surface modifying composition in at least one solvent.

3. The method of any preceding or following embodiment/feature/aspect, wherein said first solution is formed by melting said polymer or oligomer of said surface modifying composition.

4. The method of any preceding or following embodiment/feature/aspect, wherein the insoluble reaction byproduct is fluorotelomer alcohol end capped di-isocyanate.

5. The method of any preceding or following embodiment/feature/aspect, wherein the fluorotelomer alcohol (FTOH) is 4:2 FTOH, 5:2 FTOH, 6:2 FTOH, 7:2 FTOH, 8:2 FTOH, 9:2 FTOH, 10:2 FTOH, or a combination thereof.

6. The method of any preceding or following embodiment/feature/aspect, wherein the fluorotelomer alcohol is 6:2 FTOH.

7. The method of any preceding or following embodiment/feature/aspect, wherein the isocyanate has two or more isocyanate functional groups.

8. The method of any preceding or following embodiment/feature/aspect, wherein the isocyanate is di-isocyanate, tri-isocyanate, or a combination thereof.

9. The method of any preceding or following embodiment/feature/aspect, wherein the insoluble reaction byproduct is an insoluble trimer reaction byproduct.

10. The method of any preceding or following embodiment/feature/aspect, wherein a) is a polymer having a polymer backbone comprising polyurethane and fluorinated end groups.

11. The method of any preceding or following embodiment/feature/aspect, wherein a) is a polymer having a molecular weight of from about 8,500 to about 20,000, or from about 4,000 to about 15,000.

12. The method of any preceding or following embodiment/feature/aspect, wherein a) is SMM1, SMM2, SMM3, SMM4, SMM5, SMM6, SMM7, SMM8, SMM9, SMM10, SMM11, SMM12, SMM13, or SMM14, or any combination thereof.

13. The method of any preceding or following embodiment/feature/aspect, wherein the at least one solvent is present in an amount such that the insoluble reaction byproduct is soluble in the first solution in an amount of less than 10 wt % based on weight of the surface modifying composition.

14. The method of any preceding or following embodiment/feature/aspect, wherein the at least one solvent is present in an amount such that the insoluble reaction byproduct is soluble in the first solution in an amount of less than 1 wt % based on weight of the surface modifying composition.

15. The method of any preceding or following embodiment/feature/aspect, wherein the solvent is at least one of dimethylacetamide (DMAC), N-methylpyrrolidone (NMP), dimethylsulfoxide (DMSO), tetrahydrofuran (THF), N-ethylpyrrolidone, N-octylpyrrolidone, dimethylformamide (DMF), butyrolactone, or any combination thereof.

16. The method of any preceding or following embodiment/feature/aspect, wherein the removing comprises filtration, centrifugation, or other means of liquid-solid separation.

17. The method of any preceding or following embodiment/feature/aspect, wherein the insoluble reaction byproduct is present in the second solution in an amount of less than 5 wt % based on weight of the surface modifying composition.

18. The method of any preceding or following embodiment/feature/aspect, wherein substantially insoluble comprises less than 10 wt % solubility in the polymer or oligomer.

19. The method of any preceding or following embodiment/feature/aspect, wherein the polymer or oligomer is one or combination of several polyurethanes with fluoride compound attached to the terminal locations of the polymer or oligomer.

20. The method of any preceding or following embodiment/feature/aspect, wherein the polymer or oligomer is a material capable of improving the hemo-compatibility of a polymer surface.

21. The method of any preceding or following embodiment/feature/aspect, wherein the polymer or oligomer that is a material capable of improving the hemo-compatibility of a polymer surface is a SMM (Surface Modifying Macromolecule) or a SMA (Surface Modifying Additive).

22. The method of any preceding or following embodiment/feature/aspect, wherein:
the surface modifying composition comprises the polymer or oligomer in an amount of from about 50 wt % to about 99 wt % with respect to a total weight of the surface modifying composition present in the first solution.

23. The method of any preceding or following embodiment/feature/aspect, wherein:
the surface modifying composition comprises the insoluble reaction byproduct in an amount of from about 1 wt % to about 50 wt % with respect to a total weight of the surface modifying composition present in the first solution.

24. The method of any preceding or following embodiment/feature/aspect, wherein:
a ratio of a wt % of the polymer or oligomer to a wt % of the insoluble reaction byproduct in the first solution based on total weight of the first solution, is in a range of from about 1:1 to about 99:1, respectively.

25. The method of any preceding or following embodiment/feature/aspect, wherein:
the first solution contains DMAC in an amount of from about 0 wt % to about 90 wt % based on total weight of the first solution.

26. The method of any preceding or following embodiment/feature/aspect, wherein:
a total weight of DMAC and surface modifying composition present in the first solution based on total weight of the first solution is in a range of from about 0 wt % to 20 wt %.

27. The method of any preceding or following embodiment/feature/aspect, wherein:
the first solution contains DMAC in an amount of from about 0 wt % to about 50 wt % based on total weight of the first solution.

28. The method of any preceding or following embodiment/feature/aspect, wherein:
the first solution contains DMAC in an amount of from about 0 wt % to 75 wt % based on total weight of solvent present in the first solution.

29. The method of any preceding or following embodiment/feature/aspect, wherein:
DMAC is the only solvent present in the first solution.

30. The method of any preceding or following embodiment/feature/aspect, wherein:
the first solution contains the surface modifying composition in an amount of from about 10 wt % to about 100 wt % based on total weight of the first solution.

31. The method of any preceding or following embodiment/feature/aspect, wherein:
the surface modifying composition is the only non-solvent component present in the first solution.

32. The method of any preceding or following embodiment/feature/aspect, wherein:
in the second solution, the polymer or oligomer is present in an amount of from about 5 wt % to about 99.9 wt % based on total weight of the second solution.

33. The method of any preceding or following embodiment/feature/aspect, wherein:
in the second solution, a ratio of wt % of the polymer or oligomer to wt % of the insoluble reaction byproduct based on total weight of the second solution is in a range of from about 50:1 to about 999:1, respectively.

34. The method of any preceding or following embodiment/feature/aspect, wherein:
the removing removes from about 1 wt % to 100 wt % of a total weight of the insoluble reaction byproduct present in the first solution.

35. The present invention further relates to a method comprising:
forming a first solution by dissolving at least a portion of a surface modifying composition in dimethylacetamide (DMAC), the surface modifying composition comprising:
a) at least one polymer or oligomer, and
b) an insoluble reaction byproduct of i) a fluorotelomer alcohol and ii) an isocyanate; wherein said insoluble reaction byproduct is substantially insoluble in DMAC; and
removing from the first solution at least a portion of said insoluble reaction byproduct present in the first solution to obtain a second solution;
wherein said polymer or oligomer comprises a polymer or oligomer backbone covalently attached to at least one surface active group.

36. The method of any preceding or following embodiment/feature/aspect, further comprising:
combining the second solution with an additional amount of DMAC to obtain a diluted solution;
combining the diluted solution with a base polymer to obtain an admixture; and
filtering the admixture to obtain a spinning dope.

37. The method of any preceding or following embodiment/feature/aspect, wherein the base polymer is at least one of polysulfone (PSF), polyethersulfone (PES), polyarylsulfone (PAS), polyarylethersulfone (PAES), polyvinylidene fluoride (PVDF), polyacrylonitrile (PAN), or any copolymer thereof.

38. The method of any preceding or following embodiment/feature/aspect, wherein:
the diluted solution contains DMAC in an amount of from about 50 wt % to about 99 wt % based on total weight of the diluted solution.

39. The method of any preceding or following embodiment/feature/aspect, wherein:
a total weight of DMAC and surface modifying composition present in the diluted solution is in a range of from about 50 to 100%, based on total weight of the diluted solution.

40. The method of any preceding or following embodiment/feature/aspect, wherein:
the diluted solution contains DMAC in an amount of from about 50 wt % to about 75 wt % based on total weight of the diluted solution.

41. The method of any preceding or following embodiment/feature/aspect, wherein:
the diluted solution contains DMAC in an amount of from about 1 wt % to 100 wt % based on total weight of solvent present in the diluted solution.

42. The method of any preceding or following embodiment/feature/aspect, wherein:
DMAC is the only solvent present in the diluted solution.

43. The method of any preceding or following embodiment/feature/aspect, wherein:
the diluted solution contains the surface modifying composition in an amount of from about 0.1 wt % to about 15 wt %, based on total weight of the diluted solution.

44. The method of any preceding or following embodiment/feature/aspect, wherein:
the diluted solution contains the surface modifying composition in an amount of from about 0.1 wt % to 100 wt % based on total weight of non-solvent components present in the diluted solution.

45. The method of any preceding or following embodiment/feature/aspect, wherein:
the surface modifying composition is the only non-solvent component present in the diluted solution.

46. The method of any preceding or following embodiment/feature/aspect, wherein:
the base polymer comprises a mixture of polyvinylpyrrolidone (PVP) and polysulfone (PS).

47. The method of any preceding or following embodiment/feature/aspect, further comprising contacting the spinning dope with precipitation fluid to precipitate the spinning dope.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:
1. A method comprising:
forming a first solution by phase transitioning at least a portion of a surface modifying composition to a liquid state, the surface modifying composition comprising:
a) at least one polymer or oligomer, and
b) an insoluble reaction byproduct of i) a fluorotelomer alcohol and ii) an isocyanate, wherein said insoluble reaction byproduct is substantially insoluble in said polymer or oligomer; and
removing from the first solution at least a portion of said insoluble reaction byproduct present in the first solution to obtain a second solution;
wherein said polymer or oligomer comprises a polymer or oligomer backbone covalently attached to at least one surface active group, and wherein the first solution contains the surface modifying composition in an amount of from about 10 wt % to about 100 wt % based on total weight of the first solution.

2. The method of claim 1, wherein said first solution is formed by dissolving at least a portion of said surface modifying composition in at least one solvent.

3. The method of claim 1, wherein said first solution is formed by melting said polymer or oligomer of said surface modifying composition.

4. The method of claim 1, wherein the insoluble reaction byproduct is fluorotelomer alcohol end capped di-isocyanate.

5. The method of claim 1, wherein the fluorotelomer alcohol (FTOH) is 4:2 FTOH, 5:2 FTOH, 6:2 FTOH, 7:2 FTOH, 8:2 FTOH, 9:2 FTOH, 10:2 FTOH, or a combination thereof.

6. The method of claim 1, wherein the fluorotelomer alcohol is 6:2 fluorotelomer alcohol.

7. The method of claim 1, wherein the isocyanate has two or more isocyanate functional groups.

8. The method of claim 1, wherein the isocyanate is di-isocyanate, tri-isocyanate, or a combination thereof.

9. The method of claim 1, wherein the insoluble reaction byproduct is an insoluble trimer reaction byproduct.

10. The method of claim 1, wherein a) is a polymer having a polymer backbone comprising polyurethane and fluorinated end groups.

11. The method of claim 1, wherein a) is a polymer having a molecular weight in a weight average of from about 4,000 to about 15,000.

12. The method of claim 1, wherein a) is SMM1, SMM6, or SMM8 as defined in FIG. 5 or any combination thereof.

13. A method comprising:
forming a first solution by dissolving at least a portion of a surface modifying composition in dimethylacetamide (DMAC), the surface modifying composition comprising:
a) at least one polymer or oligomer, and
b) an insoluble reaction byproduct of i) a fluorotelomer alcohol and ii) an isocyanate; wherein said insoluble reaction byproduct is substantially insoluble in DMAC; and
removing from the first solution at least a portion of said insoluble reaction byproduct present in the first solution to obtain a second solution;
wherein said polymer or oligomer comprises a polymer or oligomer backbone covalently attached to at least one surface active group, and wherein the first solution contains the surface modifying composition in an amount of from about 10 wt % to about 100 wt % based on total weight of the first solution.

14. A method comprising:
forming a first solution by dissolving at least a portion of a surface modifying composition in dimethylacetamide (DMAC), the surface modifying composition comprising:
a) at least one polymer or oligomer, and
b) an insoluble reaction byproduct of i) a fluorotelomer alcohol and ii) an isocyanate; wherein said insoluble reaction byproduct is substantially insoluble in DMAC; and
removing from the first solution at least a portion of said insoluble reaction byproduct present in the first solution to obtain a second solution; wherein said polymer or oligomer comprises a polymer or oligomer backbone covalently attached to at least one surface active group; and said method further comprising
combining the second solution with an additional amount of DMAC to obtain a diluted solution;
combining the diluted solution with a base polymer to obtain an admixture; and
filtering the admixture to obtain a spin dope.

15. The method of claim 14, wherein the base polymer is at least one of polysulfone (PSF), polyethersulfone (PES), polyarylsulfone (PAS), polyarylethersulfone (PAES), polyvinylidene fluoride (PVDF), polyacrylonitrile (PAN), or any copolymer thereof.

16. The method of claim 14, wherein:
the diluted solution contains DMAC in an amount of from about 50 wt % to about 99 wt % based on total weight of the diluted solution.

17. The method of claim 14, wherein:
a total weight of DMAC and surface modifying composition present in the diluted solution is in a range of from about 50 to 100%, based on total weight of the diluted solution.

18. The method of claim 14, wherein:
the diluted solution contains the surface modifying composition in an amount of from about 0.1 wt % to about 15 wt %, based on total weight of the diluted solution.

19. The method of claim 14, wherein:
the base polymer comprises a mixture of polyvinylpyrrolidone (PVP) and polysulfone (PS).

20. The method of claim 14, further comprising contacting the spinning dope with precipitation fluid to precipitate the spinning dope.

21. The method of claim 1, wherein the surface modifying composition comprises the insoluble reaction byproduct in an amount of from about 1 wt % to about 50 wt % with respect to a total weight of the surface modifying composition present in the first solution.

* * * * *